US010989859B2

(12) United States Patent
Baek et al.

(10) Patent No.: US 10,989,859 B2
(45) Date of Patent: Apr. 27, 2021

(54) BACKLIGHT UNIT AND DISPLAY APPARATUS INCLUDING THE SAME

(71) Applicants: SAMSUNG DISPLAY CO., LTD., Yongin-si (KR); Korea University Research and Business Foundation, Sejong-si (KR)

(72) Inventors: Seungin Baek, Seongnam-si (KR); Sujin Choi, Seoul (KR); Hwi Kim, Seoul (KR); Mira Gwon, Daejeon (KR); Youngeun Park, Seoul (KR); Jongha Park, Seoul (KR); Junghwan Yi, Hwaseong-si (KR); Young jin Jeon, Seoul (KR); Jungbeom Choi, Seoul (KR); Younho Han, Seoul (KR)

(73) Assignees: SAMSUNG DISPLAY CO., LTD., Yongin-si (KR); KOREA UNIVERSITY RESEARCH AND BUSINESS FOUNDATION, SEJONG CAMPUS, Sejong-si (KR)

(*) Notice: Subject to any disclaimer, the term of this patent is extended or adjusted under 35 U.S.C. 154(b) by 2 days.

(21) Appl. No.: 16/257,599

(22) Filed: Jan. 25, 2019

(65) Prior Publication Data
US 2019/0243054 A1 Aug. 8, 2019

(30) Foreign Application Priority Data
Feb. 5, 2018 (KR) .................. 10-2018-0014235

(51) Int. Cl.
*F21V 8/00* (2006.01)
*G02B 6/02* (2006.01)
(52) U.S. Cl.
CPC .......... *G02B 6/0051* (2013.01); *G02B 6/0035* (2013.01); *G02B 6/0053* (2013.01);
(Continued)

(58) Field of Classification Search
CPC .... G02B 6/002; G02B 6/0018; F21V 2200/20
(Continued)

(56) References Cited

U.S. PATENT DOCUMENTS 7,253,799 B2 * 8/2007 Lee ...................... G02B 6/0036
345/102
7,658,531 B2 2/2010 Lee et al.
(Continued)

FOREIGN PATENT DOCUMENTS

| KR | 10-2003-0068568 | 8/2003 |
| KR | 10-2004-0090667 | 10/2004 |

(Continued)

OTHER PUBLICATIONS

Kiman Kim, "Design and Fabrication of a Multifunctional Light-Guide Plate for LCDs", Sumitomo Chemical KAGAKU, vol. 2009-I, pp. 1-7.

*Primary Examiner* — William J Carter
(74) *Attorney, Agent, or Firm* — F. Chau & Associates, LLC

(57) ABSTRACT

A display apparatus includes a light guide member disposed below a display member. A light source configured to generate light is disposed adjacent to the light guide member. The light guide member includes a plurality of diffraction on the light guide member. The diffraction patterns are spaced apart from each other in the first direction. The plurality of diffraction patterns diffract incident light, which is incident at an incident angle, to change the incident light to diffraction light having a diffraction angle. The incident angle is defined as an angle between the incident light and a normal line that is perpendicular to a top surface or a bottom surface of the light guide member. The diffraction (Continued)

angle, which is defined as an angle between the diffraction light and the normal line, has a magnitude less than that of the incident angle.

18 Claims, 14 Drawing Sheets

(52) U.S. Cl.
CPC ......... G02B 6/0055 (2013.01); G02B 6/0056 (2013.01); G02B 6/0065 (2013.01); G02B 6/0229 (2013.01); G02B 6/0036 (2013.01); G02B 6/0038 (2013.01); G02B 6/0068 (2013.01)

(58) Field of Classification Search
USPC ......................................................... 362/628
See application file for complete search history.

(56) References Cited

U.S. PATENT DOCUMENTS

| | | | | |
|---|---|---|---|---|
| 10,254,463 | B2* | 4/2019 | Han | G02B 6/0063 |
| 2004/0032659 | A1* | 2/2004 | Drinkwater | G02B 6/0051 359/558 |
| 2004/0141108 | A1* | 7/2004 | Tanaka | G02B 6/0038 349/96 |
| 2004/0207995 | A1 | 10/2004 | Park et al. | |
| 2012/0242931 | A1 | 9/2012 | Jung et al. | |
| 2014/0085570 | A1* | 3/2014 | Kuwata | G02B 6/0053 349/65 |
| 2014/0347602 | A1* | 11/2014 | Li | G02F 1/133615 349/62 |
| 2017/0168209 | A1 | 6/2017 | Shin et al. | |
| 2018/0246330 | A1* | 8/2018 | Fattal | G02B 6/0038 |
| 2019/0049777 | A1* | 2/2019 | Li | G02F 1/133617 |

FOREIGN PATENT DOCUMENTS

| | | |
|---|---|---|
| KR | 10-0459901 | 11/2004 |
| KR | 10-0881332 | 1/2009 |
| KR | 10-2012-0108729 | 10/2012 |
| KR | 10-1392063 | 4/2014 |
| KR | 10-1407576 | 6/2014 |
| KR | 10-2017-0068306 | 6/2017 |

* cited by examiner

BACKLIGHT UNIT AND DISPLAY APPARATUS INCLUDING THE SAME

CROSS-REFERENCE TO RELATED APPLICATION

This U.S. non-provisional patent application claims priority under 35 U.S.C. § 119 to Korean Patent Application No. 10-2018-0014235, filed on Feb. 5, 2018, the disclosure of which is incorporated by reference herein in its entirety.

TECHNICAL FIELD

Exemplary embodiments of the present invention relate to a display apparatus, and more particularly, to a backlight unit and a display apparatus including the same.

DISCUSSION OF RELATED ART

Electronic devices such as a mobile communication terminal, a digital camera, a notebook computer, a monitor, and a television may include a display device for displaying an image.

In general, the display device may be one of a non-emissive display device or a self-emissive display device. The non-emissive display device may include a display panel generating an image and a backlight unit providing light to the display panel. The display panel may adjust transmittance of the light provided from the backlight unit to display an image. The self-emissive display device may display an image through a light emitting layer included in pixels of the display panel. For example, the non-emissive display device may be a liquid crystal display device, and the self-emissive display device may be an organic light emitting display device. Efforts have been made to increase display quality in a display device.

SUMMARY

An exemplary embodiment of the present invention provides a display apparatus having increased display quality.

In an exemplary embodiment of the present invention, a display apparatus includes a display member configured to display an image. A light guide member is disposed below the display member. A light source configured to generate light is disposed adjacent to the light guide member. The light guide member includes a plurality of diffraction on the light guide member. The diffraction patterns are spaced apart from each other in a first direction. The plurality of diffraction patterns diffract incident light, which is incident at an incident angle, to change the incident light to diffraction light having a diffraction angle. The incident angle is defined as an angle between the incident light and a normal line that is perpendicular to a top surface or a bottom surface of the light guide member. The diffraction angle, which is defined as an angle between the diffraction light and the normal line, has a magnitude less than that of the incident angle.

In an exemplary embodiment of the present invention, the diffraction angle may be equal to or greater than 0° and equal to or less than about 10°.

In an exemplary embodiment of the present invention, the display apparatus may further include a reflective member disposed below the light guide member.

In an exemplary embodiment of the present invention, each of the diffraction patterns may have a rectangular cross-sectional shape.

In an exemplary embodiment of the present invention, each of the diffraction patterns may have side surfaces that are parallel to each other in the first direction.

In an exemplary embodiment of the present invention, the side surfaces of each of the diffraction patterns may be inclined from the top surface or the bottom surface of the light guide member.

In an exemplary embodiment of the present invention, as an inclined angle, which is defined as an angle between the side surfaces of each of the diffraction patterns and the top surface or the bottom surface of the light guide member, increases in magnitude, the frequency of the diffraction patterns may decrease.

In an exemplary embodiment of the present invention, the inclined angle may have a magnitude equal to or greater than about 20° and equal to or less than about 80°.

In an exemplary embodiment of the present invention, each of the plurality of diffraction patterns may include first to m-th portions disposed on the top surface or the bottom surface of the light guide member, the first to m-th portions may be sequentially laminated, the m-th portion may be biased in the first direction on the m−1-th portion to expose a portion of the m−1-th portion, and the m may be a natural number greater than about 1.

In an exemplary embodiment of the present invention, a side surface of each of the plurality of diffraction patterns in the first direction may have a stair shape.

In an exemplary embodiment of the present invention, the plurality of diffraction patterns may be grouped into a diffraction pattern group, the diffraction pattern group may be provided in plurality, and a distance between the plurality of diffraction pattern groups may be equal to or greater than the frequency of the diffraction patterns.

In an exemplary embodiment of the present invention, the distance between the plurality of diffraction pattern groups may gradually decrease as each of the plurality of diffraction pattern groups are further away from the light source in the first direction.

In an exemplary embodiment of the present invention, the frequency of the plurality of diffraction patterns may be equal to or greater than about 300 nm and equal to or less than about 500 nm.

In an exemplary embodiment of the present invention, the display member may include: a first substrate on which a plurality of pixels are disposed; a second substrate disposed on the first substrate and on which a light conversion layer is disposed; and a liquid crystal layer disposed between the first substrate and the second substrate. The light conversion layer may convert a wavelength band of incident light.

In an exemplary embodiment of the present invention, the light source may generate first light having a first wavelength band, the light conversion layer may include a plurality of first quantum dots configured to convert the first light provided from an optical filter layer into second light having a second wavelength band, and the first wavelength band may have a central wavelength less than that of the second wavelength band.

In an exemplary embodiment of the present invention, the light conversion layer may further include a plurality of second quantum dots configured to convert the first light provided from the optical filter layer into third light having a third wavelength band, and the third wavelength band may have a central wavelength that is less than that of the second wavelength band and greater than that of the first wavelength band.

In an exemplary embodiment of the present invention, each of the first quantum dots may have a size greater than that of each of the second quantum dots.

In an exemplary embodiment of the present invention, the first light may be blue light.

In an exemplary embodiment of the present invention, the display member may further include: a first polarizing layer disposed below the second substrate; and a second polarizing layer disposed between the liquid crystal layer and the light conversion layer.

In an exemplary embodiment of the present invention, a backlight unit includes a light guide member having a light incident surface defined on a side surface thereof in a first direction. A light source is configured to generate light and is disposed adjacent to the light incident surface. A reflective member is disposed below the light guide member. The light guide member includes a plurality of diffraction patterns provided on the light guide member. The plurality of diffraction patterns are spaced apart from each other in the first direction. Diffraction light, which is defined as light diffracted by the plurality of diffraction patterns, forms an angle equal to or greater than 0° and equal to or less than about 10° with a normal line perpendicular to a top surface or a bottom surface of the light guide member.

BRIEF DESCRIPTION OF THE FIGURES

The above and other features of the present invention will become more apparent by describing in detail exemplary embodiments thereof with reference to the accompanying drawings, in which.

DETAILED DESCRIPTION

Figure 1:
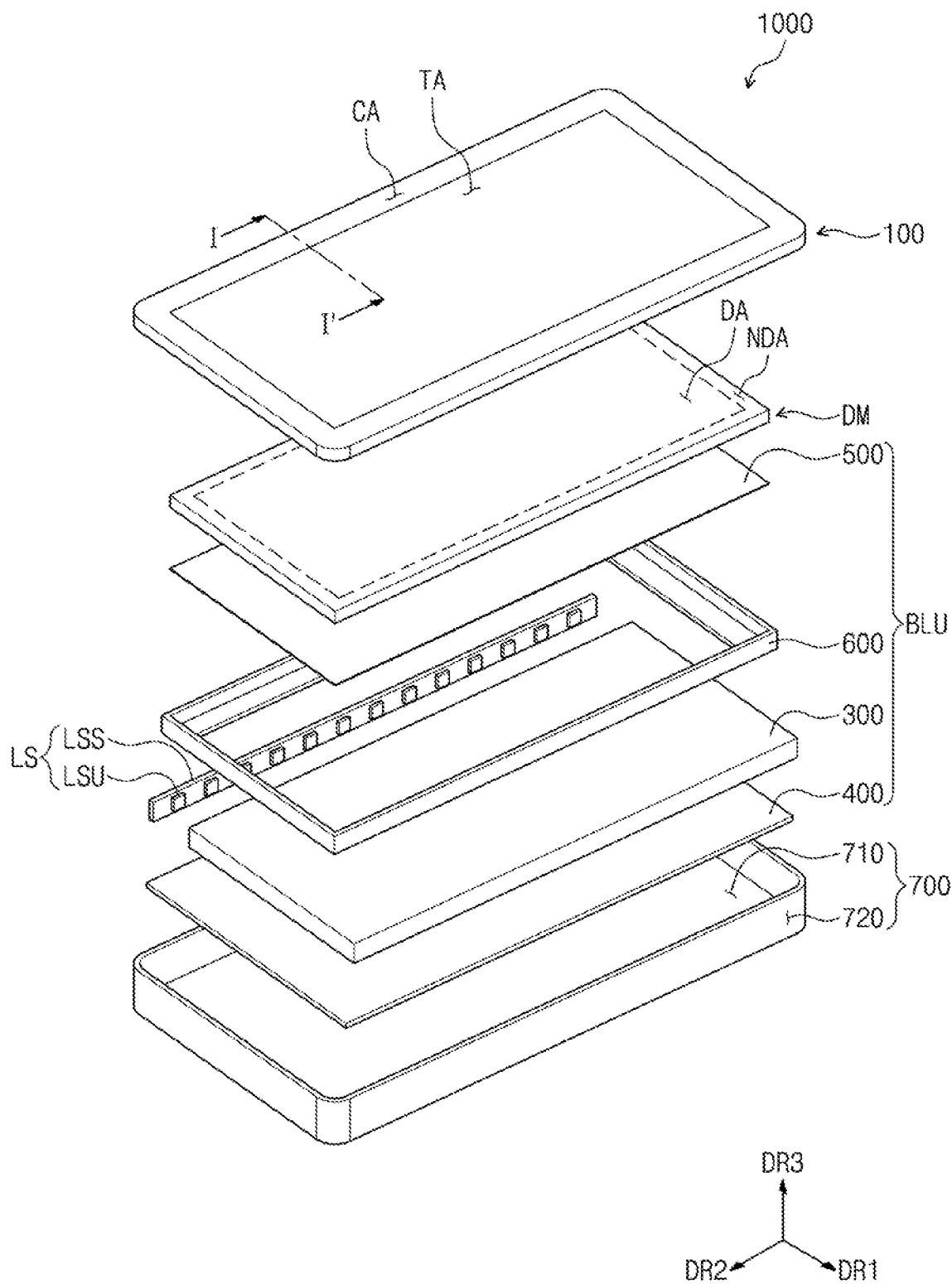
FIG. 1 is an exploded perspective view illustrating a display apparatus according to an exemplary embodiment of the present invention.

Exemplary embodiments of the present invention will be described below in more detail with reference to the accompanying drawings. In this regard, the exemplary embodiments may have different forms and should not be construed as being limited to the exemplary embodiments of the present invention described herein. Like reference numerals may refer to like elements throughout the specification and drawings.

It will be understood that when a component, such as a layer, a film, a region, or a plate, is referred to as being "on" another component, the component may be directly on the other component or intervening components may be present.

Spatially relative terms, such as "below", "beneath", "lower", "above", "upper" and the like, may be used herein for clarity of description to describe one element or feature's relationship to another element(s) or feature(s).

It will be understood that although the terms "first" and "second" may be used herein to describe various components, these components should not be limited by these terms.

The embodiment in the detailed description will be described with schematic cross-sectional views and/or plan views as exemplary views of the present invention. Accordingly, shapes of the exemplary views may be modified according to manufacturing techniques and/or allowable errors. Therefore, the embodiments of the present invention are not limited to the specific shape illustrated in the exemplary views, but may include other shapes that may be created according to manufacturing processes. Areas exemplified in the drawings have general properties, and are used to illustrate a specific shape of a semiconductor package region. Thus, this should not be construed as limited to the scope of the present invention.

Exemplary embodiments of the present invention will be described below in more detail with reference to the accompanying drawings.

Figure 2:
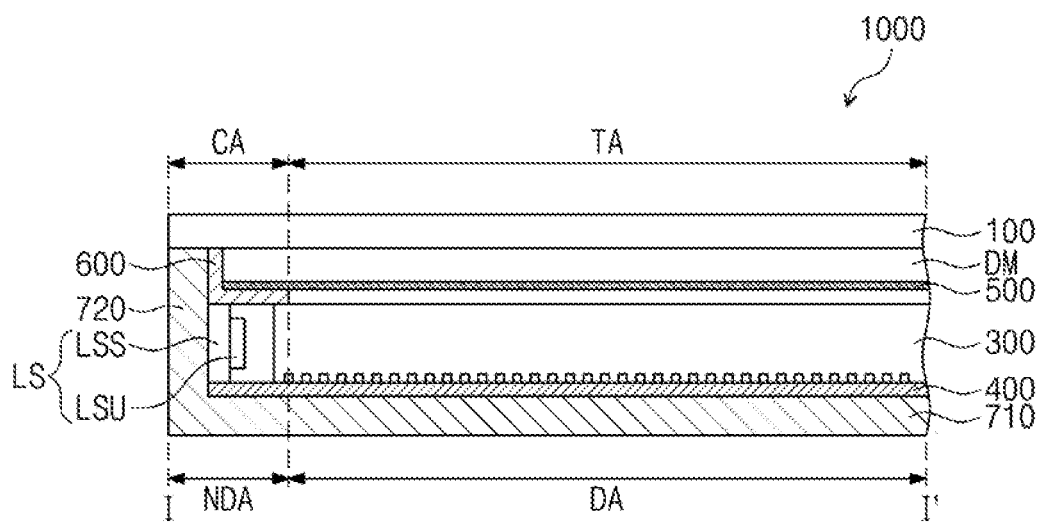
FIG. 2 is a cross-sectional view taken along line I-I' of FIG. 1.
Figure 2:
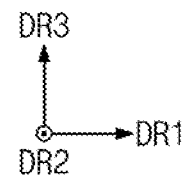

FIG. 1 is an exploded perspective view illustrating a display apparatus according to an exemplary embodiment of the present invention, and FIG. 2 is a cross-sectional view taken along line I-I' of FIG. 1.

Referring to FIGS. 1 and 2, a display apparatus 1000 according to an exemplary embodiment of the present invention may have a rectangular shape having a short side in a first direction DR1 and a long side in a second direction DR2 (e.g., when viewed in a plan view along a third direction DR3). However, the present invention is not limited to the shape of the display apparatus 1000. For example, a display apparatus 1000 according to an exemplary embodiment of the present invention may have various shapes.

As an example, the first direction DR1 may be perpendicular to the second direction DR2. The first direction DR1 and the second direction DR2 may define a plane along which a display panel extends. A third direction DR3 may be perpendicular to the first and second directions DR1 and DR2. Thus, the third direction DR3 may be orthogonal to a plane extending in the first and second directions DR1 and DR2.

The display apparatus 1000 may include a window member 100, a display module DM, a backlight unit BLU, and an accommodation member 700.

As an example, a direction described herein, in which an image is provided, in the display apparatus 1000 may be defined as an upward direction (e.g., along the third direction DR3), and a direction opposite to the upward direction may be defined as a downward direction. In an exemplary embodiment of the present invention, each of the upward and downward directions may be parallel to the third direction DR3 that is defined by a direction perpendicular to each of the first and second directions DR1 and DR2. The third direction DR3 may be a reference direction for distinguishing the front and rear surfaces of each of components that will be described in more detail below. However, the upward direction and the downward direction may be relative concepts, and thus be converted with respect to each other.

The window member 100 may include a light transmission part TA transmitting an image provided from the display module DM and a light shielding part CA through which the image is not transmitted. The light transmission part TA may be disposed on a central portion of the display apparatus 1000 on a plane defined by the first direction DR1 and the second direction DR2. The light shielding part CA may have a frame shape disposed around the light transmission part TA to surround the light transmission part TA (e.g., when viewed in a plan view along the third direction DR3).

As an example, the light shielding part CA may be arranged at four sides of the light transmission part TA in a plan view (e.g., along the third direction DR3); however, exemplary embodiments of the present invention are not limited thereto. For example, the light shielding part CA may be arranged at less than four sides (e.g., three sides) of the light transmission part TA in a plan view.

According to an exemplary embodiment of the present invention, the window member 100 of the display apparatus 1000 may include only the light transmission part TA. That is, the light shielding part CA may be omitted. In this case, an image may be transmitted through an entire top surface of the window member 100.

The window member 100 may include a material including glass, sapphire, or plastic.

The display module DM may be disposed below the window member 100. The display module DM may display an image by using light provided from the backlight unit BLU.

On the plane, a display area DA on which an image is displayed and a non-display area NDA on which an image is not displayed may be defined on the display module DM. The display area DA may be disposed on a central portion of the display module DM to overlap the light transmission part TA of the window member 100 on the plane. The non-display area NDA may surround the display area DA to overlap the light shielding part CA of the window member 100 (e.g., along the third direction DR3). As an example, the non-display region NDA may be arranged at four sides of the display region DA in a plan view (e.g., along the third direction DR3); however, exemplary embodiments of the present invention are not limited thereto. For example, the non-display region NDA may be arranged at less than four sides (e.g., three sides) of the display region DA in a plan view. The display module DM will be described in more detail below with reference to FIG. 3.

The backlight unit BLU may be disposed below the display module DM to provide light to the display module DM. According to an exemplary embodiment of the present invention, the backlight unit BLU may be an edge-type backlight unit.

The backlight unit BLU may include a light source LS, a light guide member 300, a reflective member 400, an optical member 500, and a mold frame 600.

The light source LS may be disposed adjacent to a side of the light guide member 300 (e.g., in the first direction DR1). However, the present invention is not limited to the position of the light source LS. For example, the light source LS may be disposed adjacent to at least one side surface of side surfaces of the light guide member 300. The one side surface, which is adjacent to the light source LS, of the light guide member 300 may be defined as a light incident surface. Thus, the light incident surface may face the light source LS.

The light source LS may include a plurality of light source units LSU and a light source board LSS.

The light source units LSU may generate light to be provided to the display module DM and may provide the generated light to the light guide member 300.

According to an exemplary embodiment of the present invention, the light source units LSU may generate first light. The first light may have a first wavelength band. For example, the first wavelength band may be equal to or greater than about 400 nm and equal to or less than about 500 nm. For example, the light source units LSU may generate blue light.

According to an exemplary embodiment of the present invention, each of the light source units LSU may have a type in which a light emitting diode (LED) is used as a point light source. However, the present invention is not limited to the kinds of the light source units LSU.

Also, the present invention is not limited to the number of the light source units LSU. According to an exemplary embodiment of the present invention, the light source unit LSU may be provided as a point light source of a single LED instead of a plurality of LEDs or provided as a plurality of LED groups. According to an exemplary embodiment of the present invention, the light source units LSU may be a line-type light source.

The light source units LSU may be mounted on the light source board LSS. Thus, the light source units LSU may be in direct contact with the light source board LSS and may face the light incident surface of the light guide member 300. The light source board LSS may be disposed to face a side of the light guide member 300 in the first direction DR1 and may extend in the second direction DR2. The light source board LSS may include a light source control unit connected to the light source units LSU. The light source control unit may analyze an image displayed on the display module DM to output a local dimming signal, and control a brightness of light generated by the light source units LSU in response to the local dimming signal. According to an exemplary embodiment of the present invention, the light source control unit may be mounted to a separate circuit board. The present invention is not particularly limited to the mounted position of the light source control unit.

The light guide member 300 may include a material having a relatively high transmittance in a visible ray region. For example, the light guide member 300 may include a glass material. For another example, the light guide member 300 may include a transparent polymer resin such as polymethyl methacrylate (PMMA). In an exemplary embodiment of the present invention, the light guide member 300 may have a refractive index equal to or greater than about 1.4 and equal to or less than about 1.55.

The light guide member 300 according to an exemplary embodiment of the present invention may include a plurality of diffraction patterns provided on a bottom surface of the light guide member 300. The plurality of diffraction patterns will be described in more detail below with reference to FIGS. 4 to 7.

The reflective member 400 may be disposed below the light guide member 300. The reflective member 400 may reflect light emitted to a lower side of the light guide member 300 in the upward direction. The reflective member 400 may include a light reflecting material. For example, the reflective member 400 may include aluminum or silver.

The optical member 500 may be disposed between the display module DM and the light guide member 300. The optical member 500 may diffuse and collect light provided from the light guide member 300 and provide the light to the display module DM.

The optical member 500 according to an exemplary embodiment of the present invention may include at least one prism sheet and at least one protective sheet. The prism sheet may collect the provided light in the upward direction perpendicular to the plane.

The protective sheet may protect prisms of the prism sheet from external friction. The present invention is not limited to the kind and number of the sheets included in the optical member 500. In an exemplary embodiment of the present invention, the optical member 500 may be omitted.

The mold frame 600 may be disposed between the light guide member 300 and the optical member 500. The mold frame 600 according to an exemplary embodiment of the present invention may have a frame shape (e.g., an open rectangular shape). As an example, the mold frame 600 may be disposed in correspondence to an edge of the light guide member 300 on a top surface of the light guide member 300. The display module DM and the optical member 500 may be seated on the mold frame 600. The mold frame 600 serves to fix the display module DM and components of the backlight unit BLU.

The accommodation member 700 may be disposed at a bottommost end of the display apparatus 1000 to accommodate the backlight unit BLU. The accommodation member 700 includes a bottom part 710 and a plurality of sidewall parts 720 connected to the bottom part 710. In an exemplary embodiment of the present invention, the light source LS may be disposed on an inside surface of one of the sidewall parts 720 of the accommodation member 700. The accommodation member 700 may include a metal material having relatively high rigidity.

Figure 3:
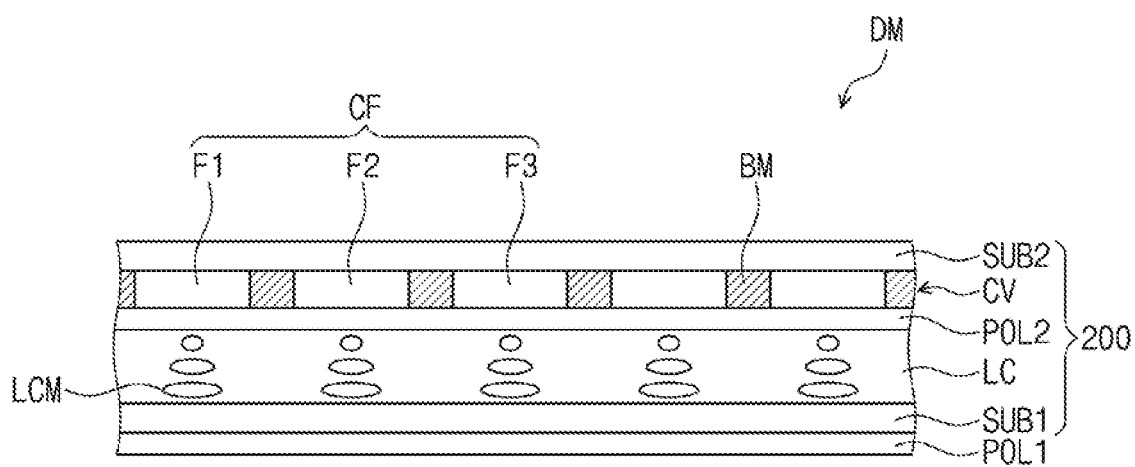
FIG. 3 is a cross-sectional view illustrating a display module in FIG. 2.

FIG. 3 is a cross-sectional view illustrating the display module in FIG. 2.

Referring to FIG. 3, the display module according to an exemplary embodiment of the present invention may include a display member 200 and a first polarizing layer POL1.

The first polarizing layer POL1 may be disposed between the display member 200 and the backlight unit BLU to polarize constituents of light provided from the backlight unit BLU. The first polarizing layer POL1 may have a transmission axis having a predetermined direction.

The display member 200 may be disposed on the first polarizing layer POL1 to display an image through the display area DA. The display member 200 may be a light-receiving type display panel. For example, according to an exemplary embodiment of the present invention, the display member 200 may be a liquid crystal display panel.

The display member 200 may include a first substrate SUB1, a second substrate SUB2, a liquid crystal layer LC, a light conversion layer CV, and a second polarizing layer POL2.

The first substrate SUB1 may be disposed on the first polarizing layer POL1. The first substrate SUB1 may include a material having a relatively high transmittance to transmit light provided from the backlight unit BLU. For example, the first substrate SUB1 may be a transparent glass substrate, a transparent plastic substrate, or a transparent film.

At least one pixel area and a surrounding area adjacent to the pixel area may be defined in the first substrate SUB1 on the plane. In an exemplary embodiment of the present invention, the pixel area may be provided in plurality, and the surrounding area may be defined between the pixel areas.

Pixels may be disposed on the pixel areas of the first substrate SUB1, respectively. Each of the pixels may include a plurality of pixel electrodes and a plurality of thin-film transistors that are electrically connected to the pixel electrodes in a one-to-one correspondence manner. The thin-film transistors may be connected to the pixel electrodes, respectively, to switch a driving signal provided to each of the pixel electrodes.

The second substrate SUB2 may be disposed above the first substrate SUB1 to face the first substrate SUB1. The liquid crystal layer LC may be disposed between the second substrate SUB2 and the first substrate SUB. The liquid crystal layer LC may be include a plurality of liquid crystal molecules LCM that are oriented in a predetermined direction.

The second substrate SUB2 may include a common electrode forming an electric field for controlling the orientation of the liquid crystal molecules LCM together with the pixel electrodes. The display member 200 may be drive the liquid crystal layer LC to display an image in the third direction DR3 (e.g., the upward direction).

The display member 200 may include a driving chip for providing a driving signal, a tape carrier package to which the driving chip is mounted, and a printed circuit board that is electrically connected to the display member 200 through the tape carrier package.

The second polarizing layer POL2 may be disposed between the liquid crystal layer LC and the second substrate SUB2. The second polarizing layer POL2 may have an absorption axis having a predetermined direction. When a display mode of the display apparatus 1000 is in a bright state, the second polarizing layer POL2 transmits light, and when the display mode of the display apparatus 1000 is in a shade state, the first polarizing layer POL1 absorbs light.

According to the orientation mode of the liquid crystal molecules LCM, an angle formed between the transmission axis of the first polarizing layer POL1 and the absorption axis of the second polarizing layer POL2 may be set. For example, the transmission axis of the first polarizing layer POL1 may be perpendicular to the absorption axis of the second polarizing layer POL2 on the plane.

The light conversion layer CV may be disposed between the second substrate SUB2 and the second polarizing layer POL2. The light conversion layer CV may be include a plurality of color filters CF and a light shielding layer BM.

The color filters CF may convert a color of light incident into the light conversion layer CV or intactly transmit the light according to energy of the light. The incident light may have various colors by the light conversion layer CV and be realized into an image.

Each of the color filters CF may include a plurality of light conversion particles. Each of the light conversion particles may be absorb at least a portion of the incident light to emit light having a specific color or intactly transmit the light.

When the light incident into the color filters CF has energy enough to excite the light conversion particles, the light conversion particles absorb at least a portion of the incident light and are converted into an excited state, and then emit the light having a specific color while being stabilized. Alternatively, when the light incident into the color filters CF has energy that is not enough to excite the light conversion particles, the incident light may be intactly transmitted through the color filter CF and seen from the outside.

As an example, a color of light emitted by the light conversion particles may be determined according to a particle size of the light conversion particles. For example, as the particle size bigger, light having a long wavelength is generated, and, as the particle size is smaller, light having a short wavelength is generated.

According to an exemplary embodiment of the present invention, the light conversion particles may be quantum dots QD. The light emitted from the light conversion particles of the color filter CF may be emitted in various directions.

According to an exemplary embodiment of the present invention, each of the color filter CF may be include a first conversion filter F1, a second conversion filter F2, and a third conversion filter F3. The light shielding layer BM may be disposed between each of the first to third conversion filters F1 to F3 to define a boundary between the first to third conversion filters F1 to F3.

The first conversion filter F1 and the second conversion filter F2 may convert light incident into the light conversion layer CV into light having wavelength bands different from each other.

According to an exemplary embodiment of the present invention, the first conversion filter F1 may absorb first light to convert the first light into second light. For example, the second light may have a wavelength band equal to or greater than about 640 nm and equal to or less than about 780 nm. For example, the first conversion filter F may convert blue light into red light.

The second conversion filter F2 may absorb the first light and convert the first light into the third light. For example, the third light may have a wavelength band equal to or greater than about 480 nm and equal to or less than about 560 nm. For example, the second conversion filter F2 may convert blue light into green light.

The third conversion filter F3 may be a colorless filter or a gray filter. When the light source units LSU of the light source LS generate light having a blue color, the third conversion filter F3 intactly transmits the incident light without changing a color of the light. The third conversion filter F3 may include various materials as long as at least a portion of the light incident into the third conversion filter F3 is transmitted. However, the present invention is not limited thereto.

As described above, the wavelength of light may be determined according to the particle size of the quantum dot. According to an exemplary embodiment of the present invention, the first conversion filter F1 may include a first quantum dot, and the second conversion filter F2 may include a second quantum dot. The third conversion filter F3 may include a third quantum dot. According to an exemplary embodiment of the present invention, the first quantum dot may have a size greater than that of the second quantum dot.

The second quantum dot may have a size greater than that of the third quantum dot. According to an exemplary embodiment of the present invention, the third conversion filter F3 might not include a quantum dot.

The light shielding layer BM may be disposed adjacent to the color filter CF. The light shielding layer BM may include a light shielding material. The light shielding layer BM may have a shape corresponding to the surrounding area. The light shielding layer BM may prevent a phenomenon in which light is leaked to an area except for the pixel area on which light is displayed and may define a boundary between the pixel areas adjacent to each other.

Figure 4:
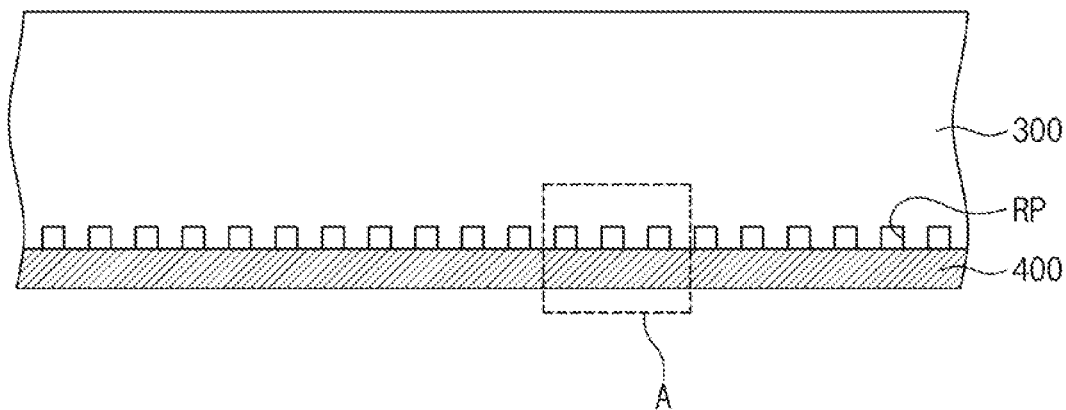
FIG. 4 is a cross-sectional view illustrating a light guide member in FIG. 2.
Figure 4:
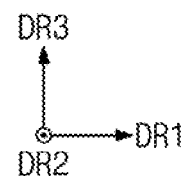
Figure 5:
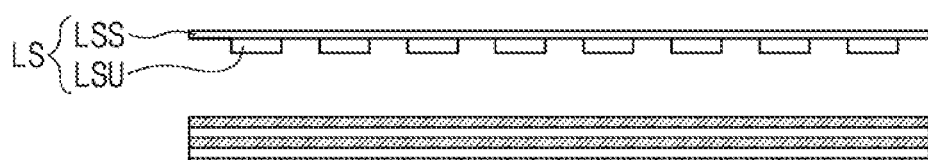
FIG. 5 is a rear view illustrating the light guide member in FIG. 2.
Figure 5:
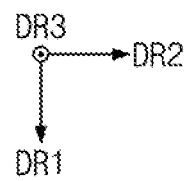
Figure 6:
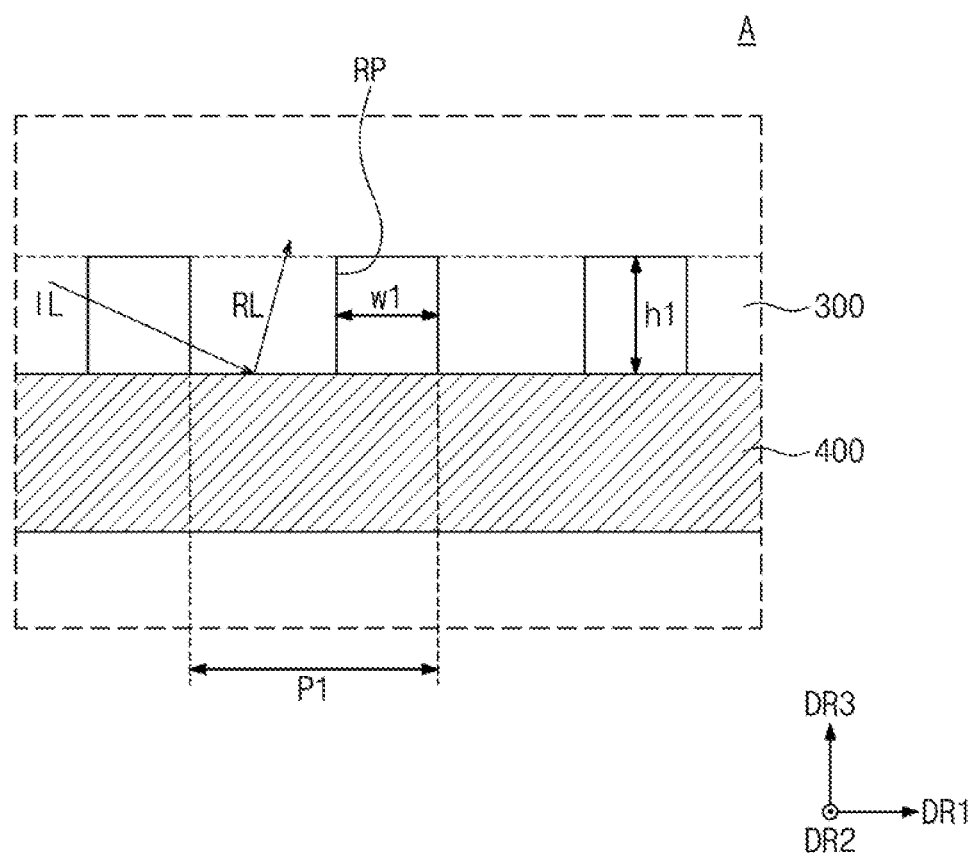
FIG. 6 is an enlarged view illustrating a region A of FIG. 4.

FIG. 4 is a cross-sectional view of the light guide member in FIG. 2, and FIG. 5 is a rear view of the light guide member in FIG. 2. FIG. 5 is an enlarged view illustrating a region A in FIG. 4;

Referring to FIGS. 4 to 6, the light guide member 300 according to an exemplary embodiment of the present invention may include a plurality of diffraction patterns RP provided on the light guide member 300. For example, the diffraction patterns RP may be disposed on a bottom surface of the light guide member 300. Each of the diffraction patterns RP may have a shape protruding upward from the bottom surface of the light guide member 300. The diffraction patterns RP may be spaced apart from each other in the first direction DR1 and may extend in the second direction DR2. For example, each of the diffraction patterns RP may have a stripe shape extending in the second direction DR2 on the bottom surface of the light guide member 300.

In an exemplary embodiment of the present invention, each of the diffraction patterns RP may have a rectangular shape on a cross-section defined by the first direction DR1 and the third direction DR3. For example, side surfaces of each of the diffraction patterns RP may be parallel to each other in the first direction DR1 and/or in the second direction DR2 and/or in the third direction DR3. For example, in the cross-section, each of the diffraction patterns RP may have a parallelogram shape. However, the present invention is not particularly limited to the shape of each of the diffraction patterns RP. For example, diffraction patterns RP according to an exemplary embodiment of the present invention may have a triangular shape or a sine wave shape.

The diffraction patterns RP may have a predetermined frequency P1 in the first direction DR1. According to an exemplary embodiment of the present invention, a wavelength of light incident into the diffraction patterns RP may be defined as $\lambda$, and a refractive index of the light guide member 300 may be defined as n, a frequency P1 of the diffraction patterns may be $\lambda/(n \sin \theta 1 - \sin \theta 2)$. For example, the frequency P1 of the diffraction patterns RP may be equal to or greater than about 300 nm and equal to or less than about 500 nm.

Each of the diffraction patterns RP may have a first length h1 (e.g., a first height). In an exemplary embodiment of the present invention, the first height h1 may be equal to or greater than about 150 nm and equal to or less than about 300 nm.

A distance between the diffraction patterns RP may be a first width W1 in the first direction DR1. In an exemplary embodiment of the present invention, the first width W1 may be equal to or greater than about 100 nm and equal to or less than about 200 nm.

Figure 7:
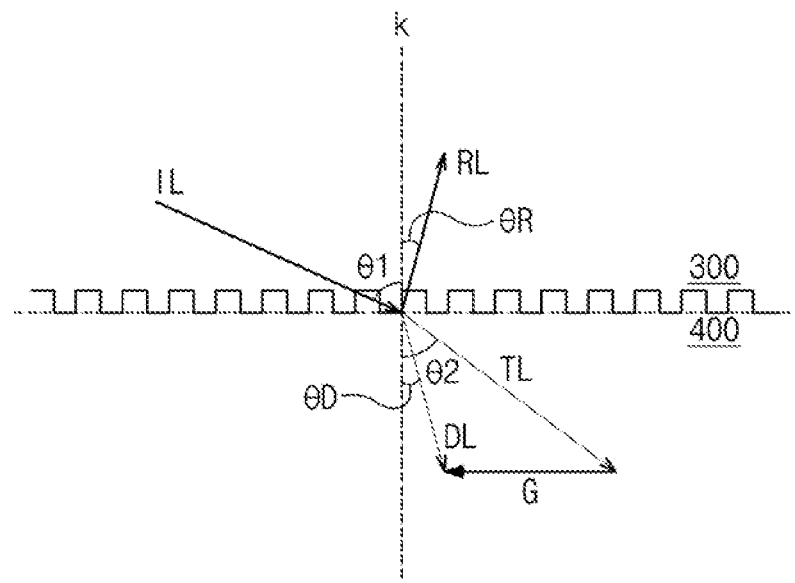
FIG. 7 is a schematic view illustrating a light traveling path of light incident into a diffraction pattern according to an exemplary embodiment of the present invention.

FIG. 7 is a schematic view illustrating a light traveling path of light incident into a diffraction pattern according to an exemplary embodiment of the present invention.

Referring to FIG. 7 together with FIGS. 4 to 6, the diffraction patterns RP according to an exemplary embodiment of the present invention may serve to diffract light incident into the diffraction patterns RP in a predetermined direction.

As an example below, the light incident into the diffraction patterns RP from an inside of the light guide member 300 may be defined as incident light IL, and an angle between the incident light IL and a normal line k perpendicular to the bottom surface of the light guide member 300 may be defined as an incident angle θ1. Also, light diffracted by the diffraction patterns RP may be defined as diffraction light DL, and an angle between the diffraction light DL and the normal line k may be s defined as a diffraction angle θD.

According to an exemplary embodiment of the present invention, the incident angle θ1 of the incident light IL may have a magnitude greater than that of the diffraction angle θD of the diffracted light DL. For example, the diffraction angle θD may have a magnitude equal to or greater than 0° and equal to or less than about 10°.

The diffraction light DL diffracted by the diffraction patterns RP may be reflected by the reflective member 400 and re-incident into the light guide member 300. An angle between the reflected light RL may be reflected by the reflective member 400 and the normal line k of the top surface of the light guide member 300 may be defined as a reflection angle θR. In an exemplary embodiment of the present invention, the reflection angle θR may have a magnitude equal to that of the diffraction angle θD.

According to an exemplary embodiment of the present invention, when the light guide member 300 does not include the diffraction patterns RP, the incident light IL having the incident angle θ1 and incident into the bottom surface of the light guide member 300 with the incident angle may be refracted and emitted from the bottom surface of the light guide member 300. Here, the emitted light may be defined as emitted light TL, and an angle between the emitted light TL and the normal line k perpendicular to the bottom surface of the light guide member 300 may be defined as an emitted angle θ2. The emitted angle θ2 may have a magnitude greater than that of the diffraction angle θD and less than that of a total reflection angle. For example, the emitted angle θ2 may be from about 30° to about 40°. The emitted light TL emitted with the emitted angle θ2 may be re-incident into the light guide member 300 by the reflective member 400. When the display apparatus is in a dark state mode, a portion of the emitted light TL provided to the display module DM from the top surface of the light guide member 300 may be transmitted through the second polarizing layer POL2 without being absorbed by the second polarizing layer POL2. The transmitted light may degrade a contrast ratio when the display apparatus is in the dark state mode. However, according to an exemplary embodiment of the present invention, the plurality of diffraction patterns RP having the predetermined frequency P1 may diffract the incident light IL that is incident into the diffraction patterns RP so that the incident light IL has the diffraction angle θD instead of the emitted angle θ2. As an example, when the display apparatus 1000 is in the dark state mode, the light provided to the display module DM at an angle transmitting the second polarizing layer POL2 may be removed. Thus, the contrast ratio of the display apparatus 1000 may be increased.

According to an exemplary embodiment of the present invention, a degree of diffracting the incident light IL by the diffraction patterns RP may be defined as a diffraction factor G. The diffraction factor G may be a vector magnitude. The diffraction factor G is the same as a difference between a vector magnitude of the emitted light TL and a vector magnitude of the diffraction light DL. Accordingly, the diffraction factor G may have a magnitude proportional to the difference between the emitted angle θ2 and the diffraction angle θD. When the diffraction patterns RP has a frequency of P1, the diffraction factor G may have a magnitude of $2\eta/P1$.

Figure 8:
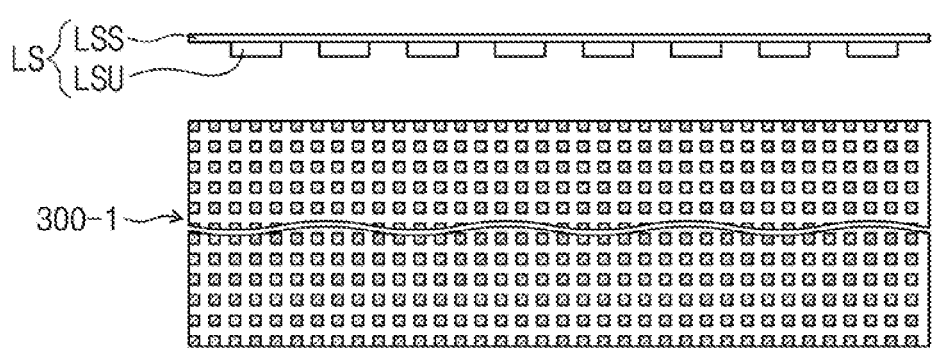
FIG. 8 is a rear view illustrating a light guide member according to an exemplary embodiment of the present invention.
Figure 8:
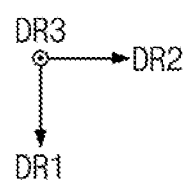

FIG. 8 is a rear view illustrating a light guide member according to an exemplary embodiment of the present invention.

Descriptions of components that are the same or substantially the same as those described above may be omitted below, and thus differences from the exemplary embodiments of the present invention described above may be focused on below.

Descriptions of technical features or aspects of an exemplary embodiment of the present invention should typically be considered as available and applicable to other similar features or aspects in another exemplary embodiment of the present invention. Accordingly, technical features described herein according to one exemplary embodiment of the present invention may be applicable to other exemplary embodiments of the present invention, and thus duplicative descriptions may be omitted herein.

Referring to FIG. 8, each of a plurality of diffraction patterns RP-1 according to an exemplary embodiment of the present invention may have a rectangular pillar shape. For example, each of the diffraction patterns RP-1 may have a rectangular shape on a bottom surface of a light guide member 300-1. The diffraction patterns RP-1 may be disposed on the bottom surface of a light guide member 300-1. According to an exemplary embodiment of the present invention, the diffraction patterns RP-1 may be arranged in a matrix type on the bottom surface of a light guide member 300-1. For example, the plurality of diffraction patterns RP-1 may be arranged in the first direction DR1 and the second direction DR2.

Figure 9:
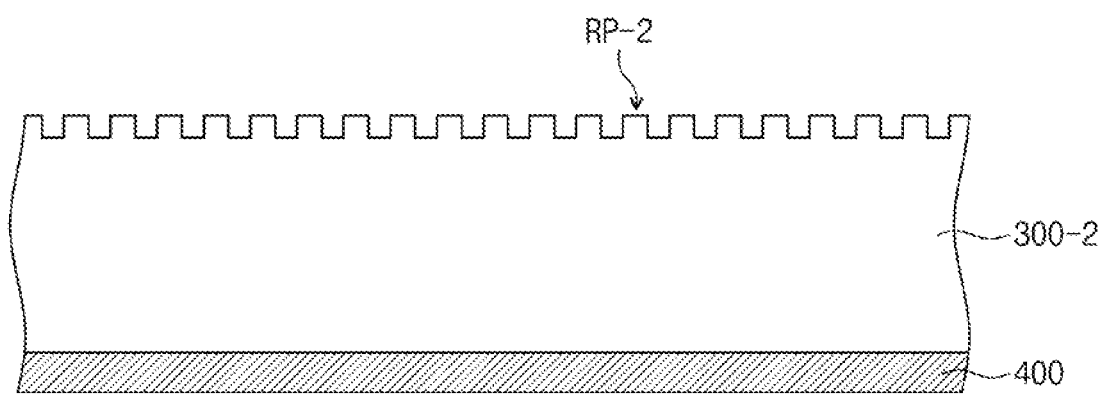
FIG. 9 is a cross-sectional view illustrating a light guide member according to an exemplary embodiment of the present invention.

FIG. 9 is a cross-sectional view illustrating a light guide member according to an exemplary embodiment of the present invention.

Descriptions of components that are the same or substantially the same as those described above may be omitted below, and thus differences from the exemplary embodiments of the present invention described above may be focused on below.

Descriptions of technical features or aspects of an exemplary embodiment of the present invention should typically be considered as available and applicable to other similar features or aspects in another exemplary embodiment of the present invention. Accordingly, technical features described herein according to one exemplary embodiment of the present invention may be applicable to other exemplary embodiments of the present invention, and thus duplicative descriptions may be omitted herein.

Referring to FIG. 9, a plurality of diffraction patterns RP-2 of a light guide member 300-2 according to an exemplary embodiment of the present invention may be provided on a top surface of the light guide member 300-2. Light incident into the diffraction patterns RP-2 in the light guide member 300 may be diffracted by the diffraction patterns RP-2 and emitted in the upward direction.

Figure 10:
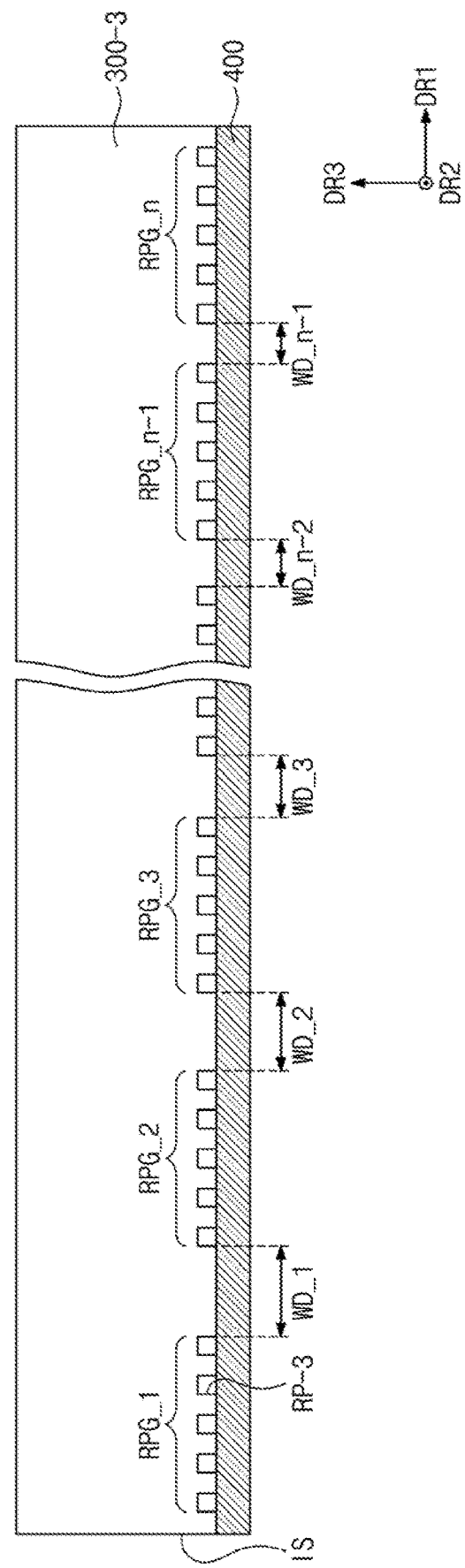
FIG. 10 is a cross-sectional view illustrating a light guide member according to an exemplary embodiment of the present invention.

FIG. 10 is a cross-sectional view illustrating a light guide member according to an exemplary embodiment of the present invention.

Descriptions of components that are the same or substantially the same as those described above may be omitted below, and thus differences from the exemplary embodiments of the present invention described above may be focused on below.

Descriptions of technical features or aspects of an exemplary embodiment of the present invention should typically be considered as available and applicable to other similar features or aspects in another exemplary embodiment of the present invention. Accordingly, technical features described herein according to one exemplary embodiment of the present invention may be applicable to other exemplary embodiments of the present invention, and thus duplicative descriptions may be omitted herein.

Referring to FIG. 10, a light guide member 300-3 according to an exemplary embodiment of the present invention may include a plurality of diffraction pattern groups RPG_1 and RPG_n provided on a bottom surface of the light guide member 300-3. Each of the first to n-th diffraction pattern groups RPG_1 and RPG_n may include a plurality of diffraction patterns RP-3. Here, n is a natural number greater than 1.

The first to n-th diffraction pattern groups RPG_1 and RPG_n may be arranged in the first direction DR1. Each of the first to n-th diffraction pattern groups RPG_1 and RPG_n may be spaced apart from each other.

According to an exemplary embodiment of the present invention, a distance WD_1 to WD_n−1 between each of the first to n-th diffraction pattern groups RPG_1 and RPG_n may be equal to or greater than a first width W1 that is a distance between the diffraction patterns RP-3 in the first direction DR1.

According to an exemplary embodiment of the present invention, the distance WD_1 to WD_n−1 between each of the first to n-th diffraction pattern groups RPG_1 and RPG_n may gradually decrease as the each of the first to n-th diffraction pattern groups RPG_1 and RPG_n is away from the light incident surface IS in the first direction DR1. Resultantly, according to an exemplary embodiment of the present invention, the display apparatus 1000 may have an increased brightness uniformity.

As an alternative for increasing the brightness uniformity of the display apparatus 1000, the first to n-th diffraction pattern groups RPG_1 and RPG may gradually increase in size in an order of the arrangement in the first direction DR1. For example, the diffraction patterns RP-2 included in the n-th diffraction pattern groups RPG_n may have a size greater than that of the diffraction patterns included in the n_1-th diffraction pattern groups RPG_n−1.

Figure 11:
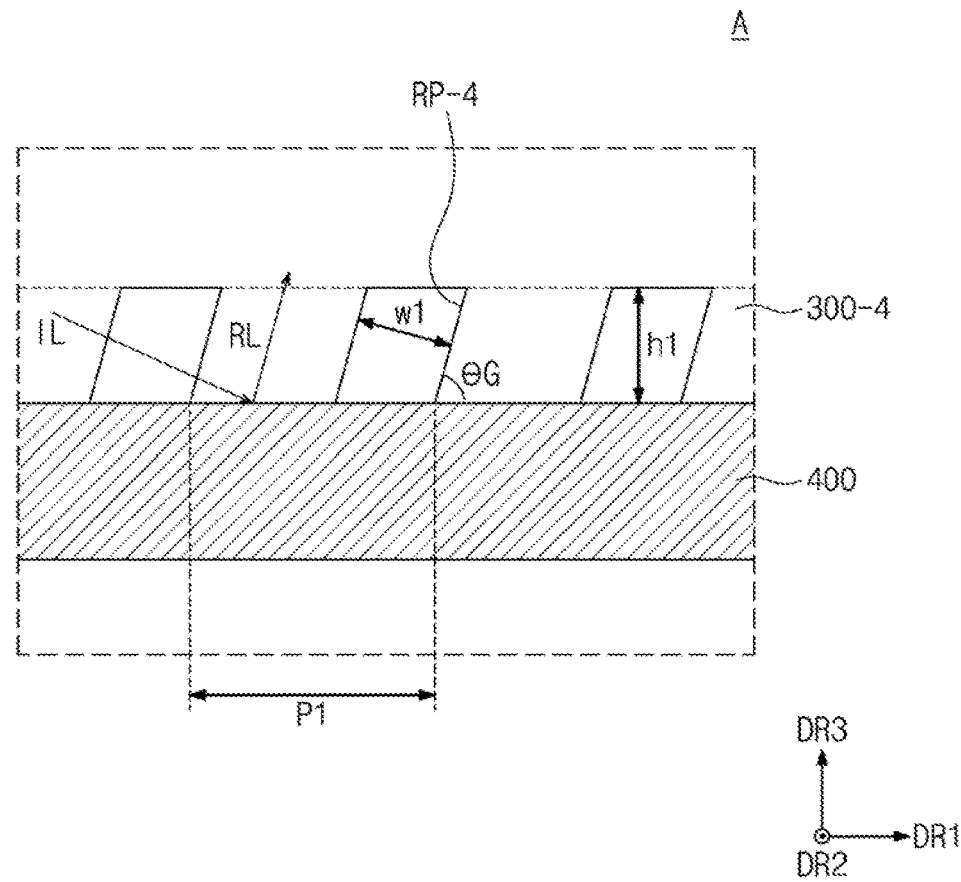
FIG. 11 is a cross-sectional view illustrating diffraction patterns according to an exemplary embodiment of the present invention.
Figure 12:
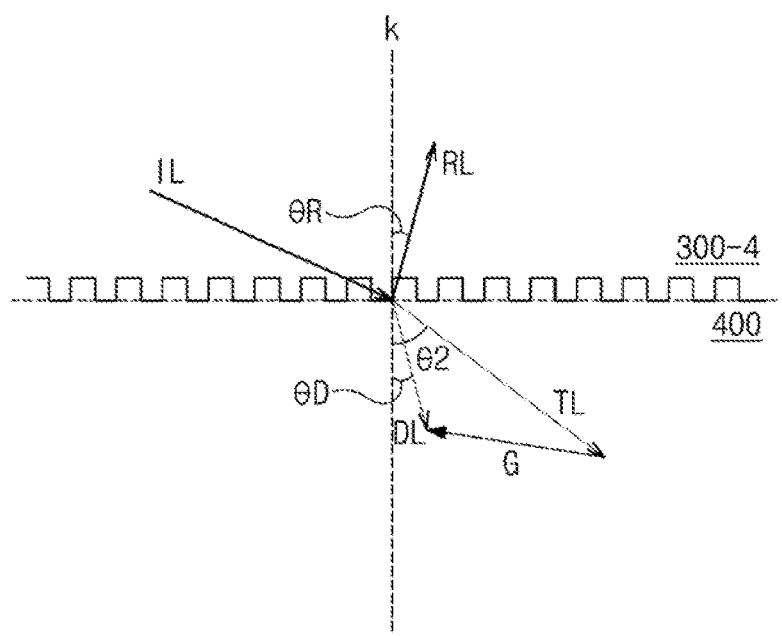
FIG. 12 is a schematic view illustrating a light traveling path of light incident into the diffraction patterns in FIG. 11.

FIG. 11 is a cross-sectional view illustrating diffraction patterns according to an exemplary embodiment of the present invention, and FIG. 12 is a schematic view illustrating a light traveling path of light incident into the diffraction pattern in FIG. 11.

Descriptions of components that are the same or substantially the same as those described above may be omitted below, and thus differences from the exemplary embodiments of the present invention described above may be focused on below.

Descriptions of technical features or aspects of an exemplary embodiment of the present invention should typically be considered as available and applicable to other similar features or aspects in another exemplary embodiment of the present invention. Accordingly, technical features described herein according to one exemplary embodiment of the present invention may be applicable to other exemplary embodiments of the present invention, and thus duplicative descriptions may be omitted herein.

Referring to FIG. 11, each of diffraction patterns RP-4 according to an exemplary embodiment of the present invention may have a parallelogram shape having side surfaces inclined from the bottom surface of the light guide member 300-4. The side surfaces of each of the diffraction patterns RP-4 may be parallel to each other in the first direction DR1. An angle between the side surfaces of each of the diffraction patterns RP-4 and the bottom surface of the light guide member 300-4 is defined as an inclined angle $\theta G$. For example, the inclined angle $\theta G$ may have a magnitude equal to or greater than about 20° and equal to or less than about 80°, or desirably about 40°.

The diffraction patterns RP-4 may have a predetermined frequency P1 in the first direction DR1. In an exemplary embodiment of the present invention, the frequency P1 of the diffraction patterns RP-4 may be $\lambda/(n \sin \theta 1 - \sin \theta 2)$. For example, the frequency P1 of the diffraction patterns RP-4 may be equal to or greater than about 300 nm and equal to or less than about 500 nm. According to an exemplary embodiment of the present invention, as the magnitude of the inclined angle $\theta G$ increases, the frequency P1 of the diffraction patterns RP-4 may decrease.

Each of the diffraction patterns RP-4 may have a first length h1. In an exemplary embodiment of the present invention, the first height h1 may be equal to or greater than about 150 nm and equal to or less than about 300 nm.

A vertical distance between the diffraction patterns RP-4 may have a first width W1 in the first direction DR1. For example, a vertical distance between a first side surface of one diffraction pattern RP-4 in the first direction DR1 and a second side surface of the diffraction pattern RP-4 adjacent to the first side surface in the first direction DR1 may have the first width W1. In an exemplary embodiment of the present invention, the first width W1 may be equal to or greater than about 100 nm and equal to or less than about 200 nm.

Although the diffraction patterns RP-4 may be inclined as each of the diffraction patterns RP-4 are positioned further away from the light incident surface in the first direction DR1 in FIG. 11, the present invention is not limited thereto. In an exemplary embodiment of the present invention, the inclined angle $\theta G$ of the diffraction patterns RP-4 may have a negative value. For example, the diffraction patterns RP-4 may be inclined as each of the diffraction patterns RP-4 is toward the light incident surface in the first direction DR1.

According to an exemplary embodiment of the present invention, a diffraction factor G of the diffraction patterns RP-4 may be the same as a difference between a vector quantity of the emitted light TL and a vector quantity of the diffraction light DL. In an exemplary embodiment of the present invention, the diffraction factor G may be $2\pi/P1(\sin \theta G, \cos \theta G)$.

Figure 13:
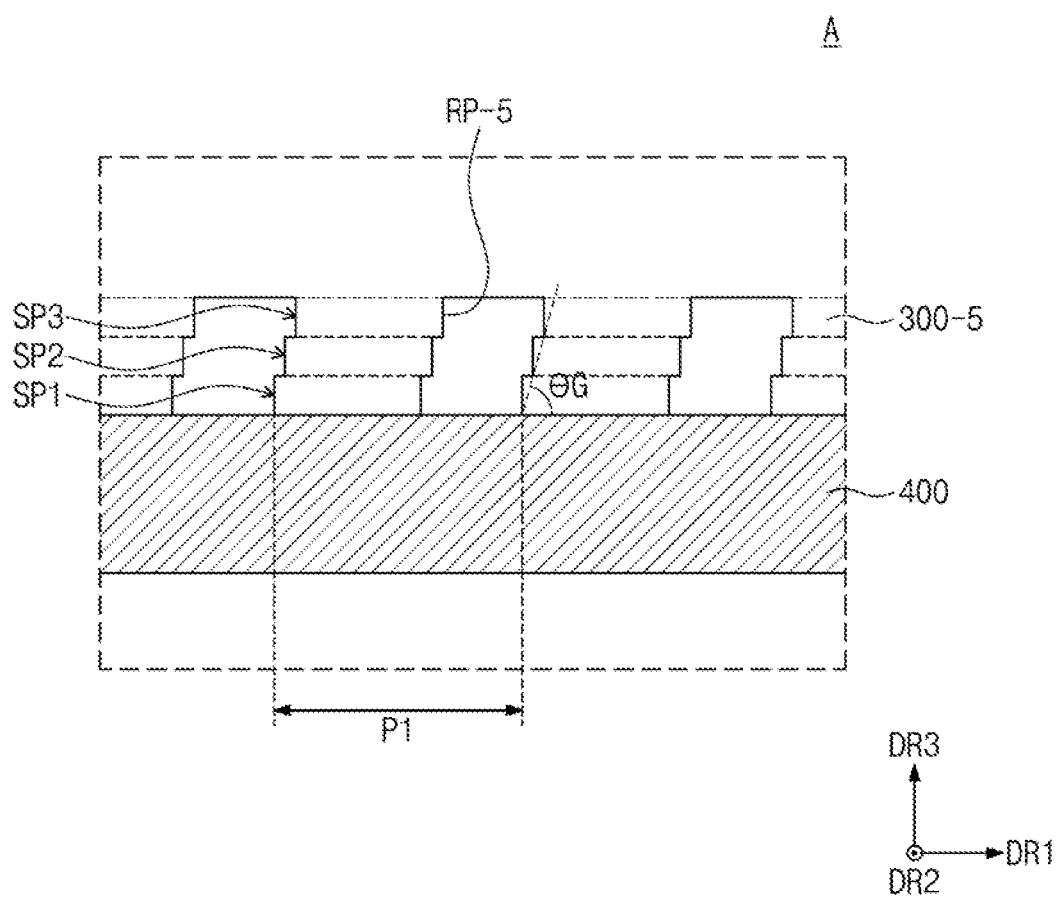
FIG. 13 is a cross-sectional view illustrating diffraction patterns according to an exemplary embodiment of the present invention.

FIG. 13 is a cross-sectional view illustrating diffraction patterns according to an exemplary embodiment of the present invention.

Descriptions of components that are the same or substantially the same as those described above may be omitted below, and thus differences from the exemplary embodiments of the present invention described above may be focused on below.

Descriptions of technical features or aspects of an exemplary embodiment of the present invention should typically be considered as available and applicable to other similar features or aspects in another exemplary embodiment of the present invention. Accordingly, technical features described herein according to one exemplary embodiment of the present invention may be applicable to other exemplary embodiments of the present invention, and thus duplicative descriptions may be omitted herein.

Referring to FIG. 13, each of diffraction patterns RP-5 of a light guide member 300-5 according to an exemplary embodiment of the present invention may include a first to third portions SP1 to SP3.

The first to third portions SP1 to SP3 may be sequentially laminated from a bottom surface of the light guide member 300-5 in the downward direction. For example, a top surface of the first portion SP1 may directly contact the bottom surface of the light guide member 300-5, a top surface of the second portion SP2 may directly contact a bottom surface of the first portion SP1, a top surface of the third portion SP3 may directly contact a bottom surface of the second portion SP2.

According to an exemplary embodiment of the present invention, side surfaces of each of the diffraction patterns RP-5 may have a stair shape. The stair shape may have a shape inclined as the diffraction patterns RP-5 move further away from the light incident surface in the first direction DR1 and in the upward direction. The inclined angle θG, which is inclined as described above, may be equal to or greater than about 20° and equal to or less than about 80°.

The first to third portions SP1 to SP3 may be disposed biased in the direction away from the light incident surface in the first direction DR1 in an arrangement order of the first to third portions SP1 to SP3 in the downward direction. For example, the second portion SP2 may be biased to a side of the first direction DR1 on the bottom surface of the first portion SP1. For example, another side of the first direction DR1 of an area on the bottom surface of the first portion SP1 may be exposed by the second portion SP2. The third portion SP3 is disposed biased to a side of the first direction DR1 on the bottom surface of the second portion SP2. For example, the other side of the first direction DR1 of an area on the bottom surface of the second portion SP2 may be exposed by the third portion SP3.

Although each of the diffraction patterns RP-5 may include three portions SP1 to SP3 in FIG. 13, the present invention is not particularly limited to the number of the portions includes in the diffraction patterns RP-5.

According to an exemplary embodiment of the present invention, the diffraction patterns RP-5 may be provided on the bottom surface of the light guide member 300-5.

Figure 14:
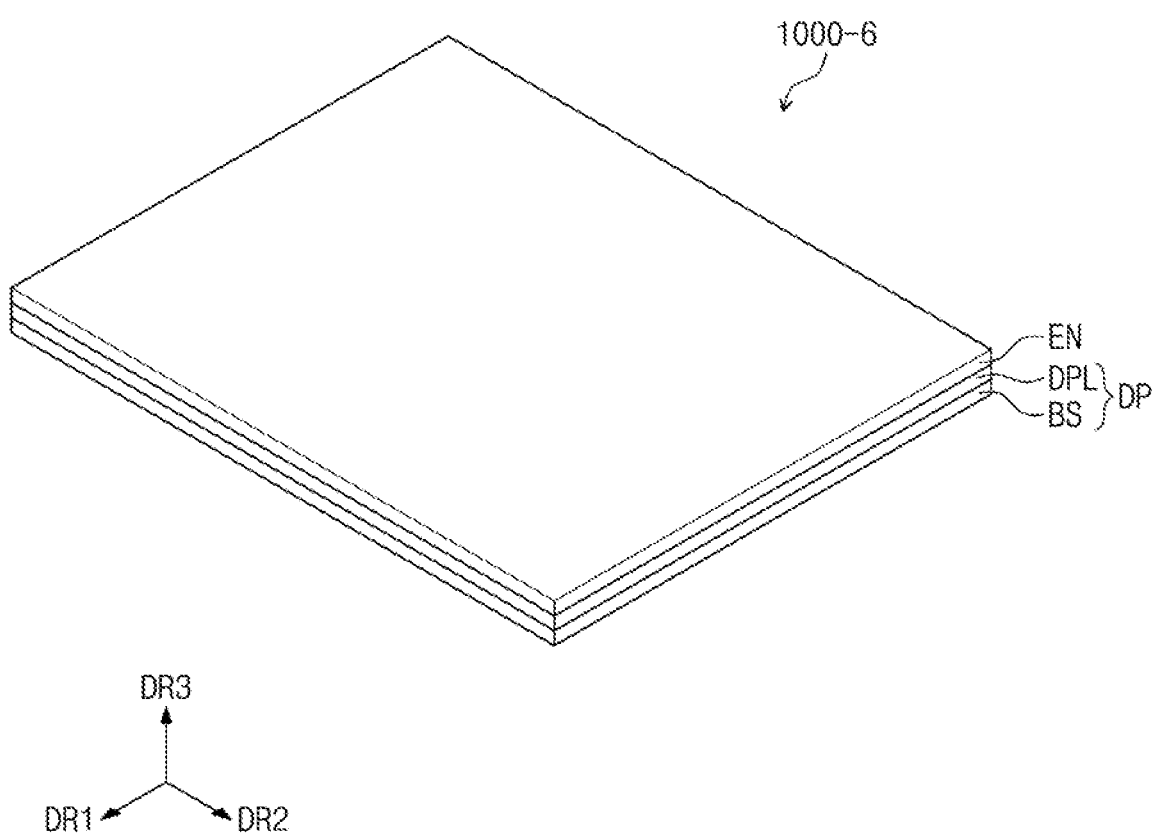
FIG. 14 is a perspective view of a display apparatus according to an exemplary embodiment of the present invention.
Figure 15:
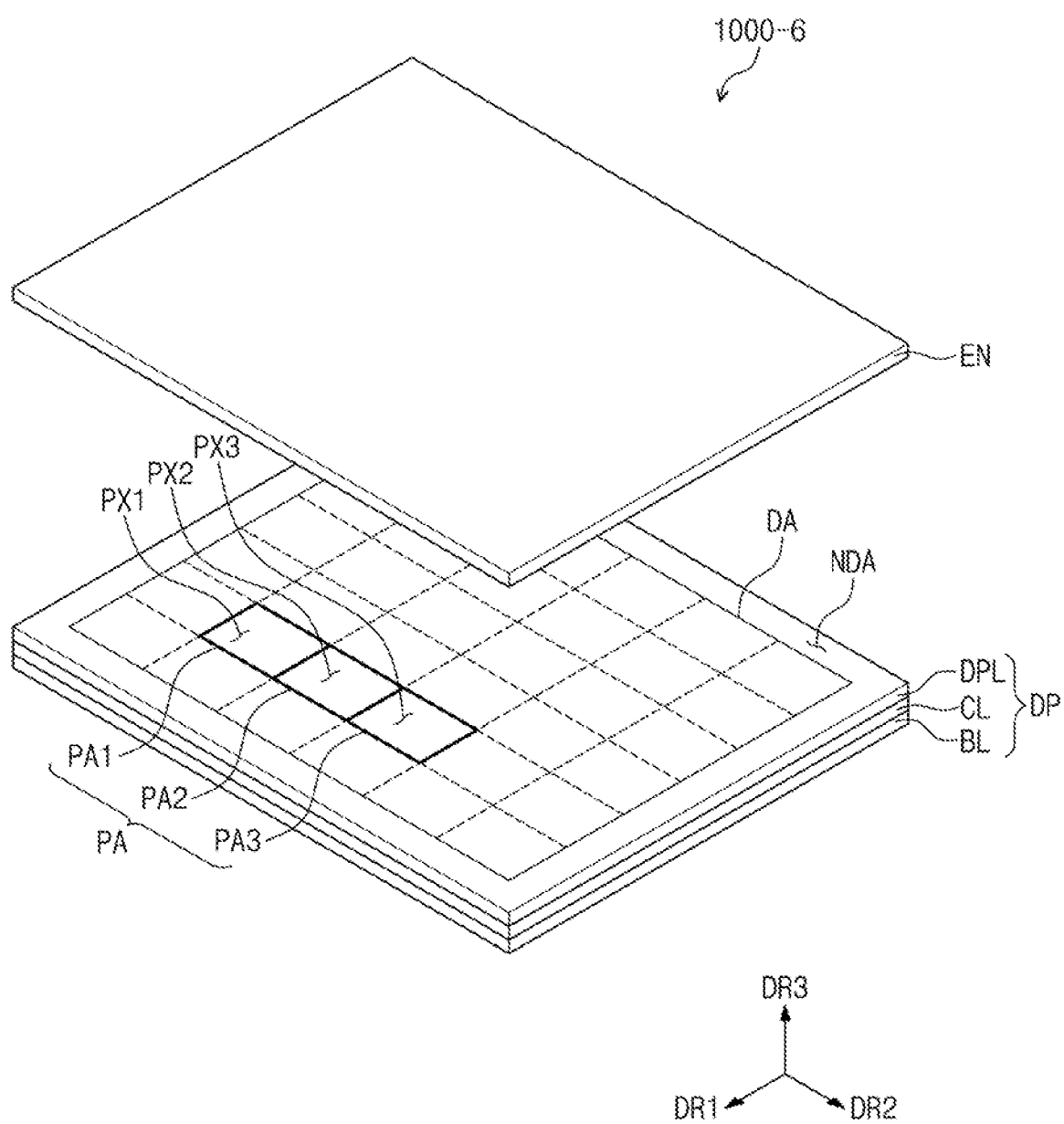
FIG. 15 is an exploded perspective view illustrating the display apparatus in FIG. 14.
Figure 16:
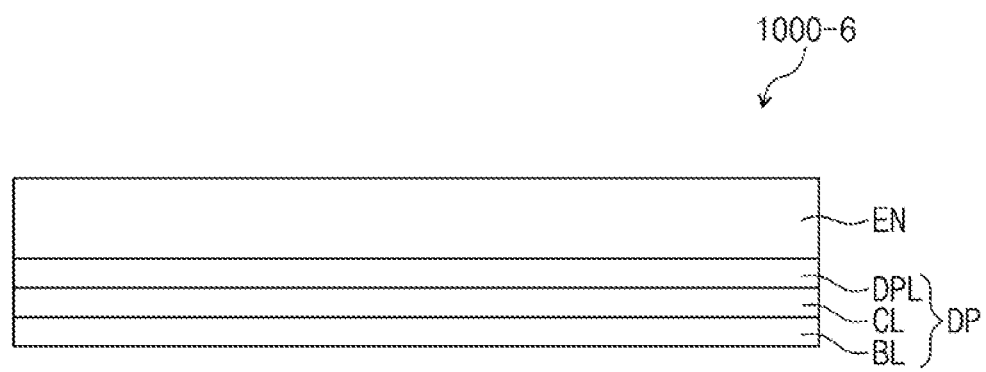
FIG. 16 is a cross-sectional view illustrating the display apparatus in FIG. 14.

FIG. 14 is a perspective view illustrating a display apparatus according to an exemplary embodiment of the present invention, and FIG. 15 is an exploded perspective view illustrating the display apparatus in FIG. 14. FIG. 16 is a cross-sectional view illustrating the display apparatus in FIG. 14.

A display apparatus 1000-6 according to an exemplary embodiment of the present invention may include a display panel DP and an encapsulation member EN.

The display panel DP may generate an image according to an electrical signal. For example, the display panel DP may be a glass light emitting display panel.

The display panel DP may include a display area DA and a non-display area NDA. The display area DA may display an image. When the display apparatus 1000-6 is viewed from a direction in which an image is displayed, the display area DA may have an approximately rectangular shape. However, the present invention is not limited thereto.

The display area DA may include a plurality of pixel areas PA. The pixel areas PA may be arranged in a matrix-type on a plane defined by the first direction DR1 and the second directions DR2. Although the pixel areas PA are exemplarily illustrated, the present invention is not limited thereto. For example, the plurality of pixel areas PA may be variously arranged.

Figure 17:
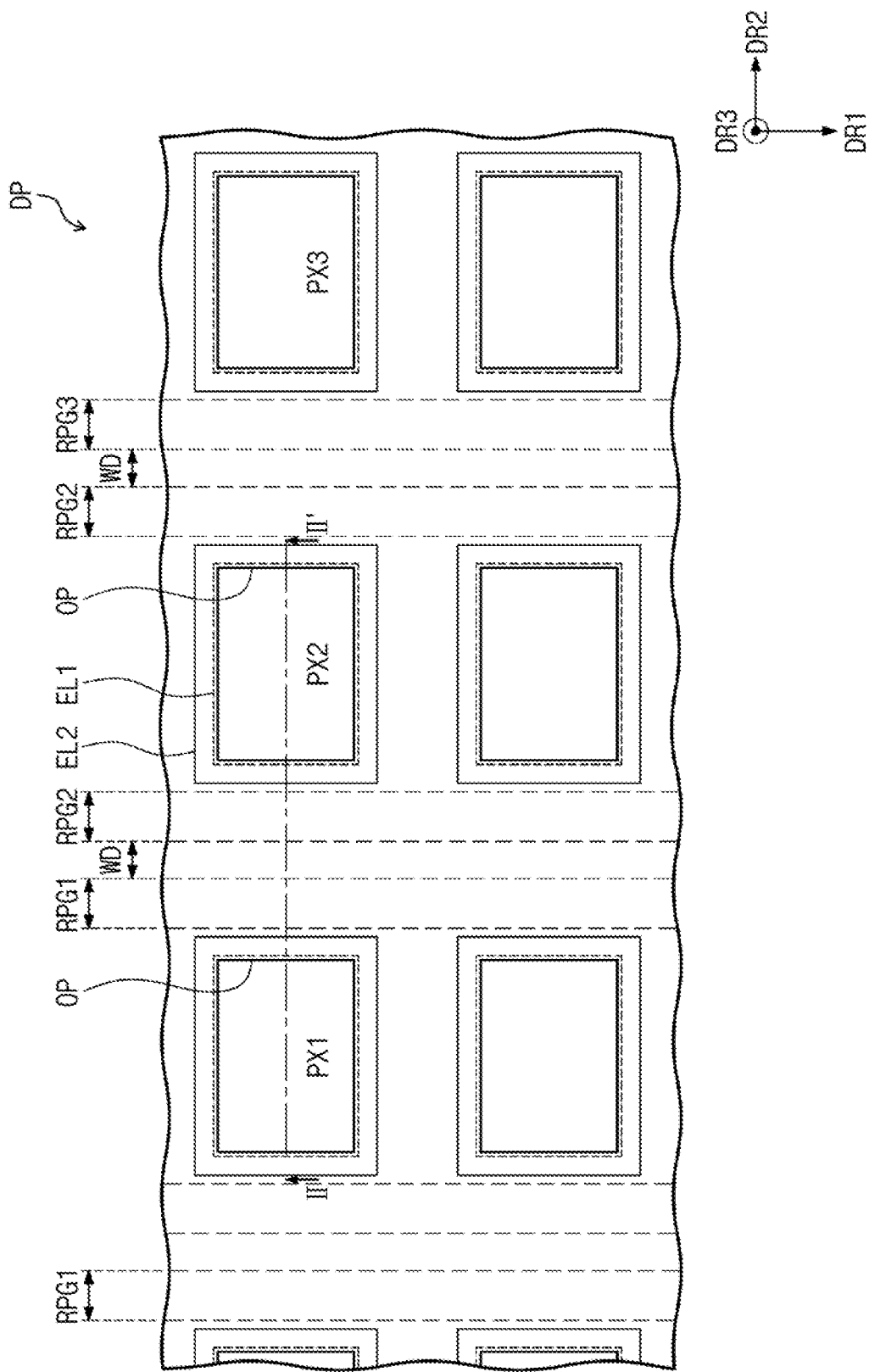
FIG. 17 is a plan view illustrating a display layer in FIG. 15.
Figure 18:
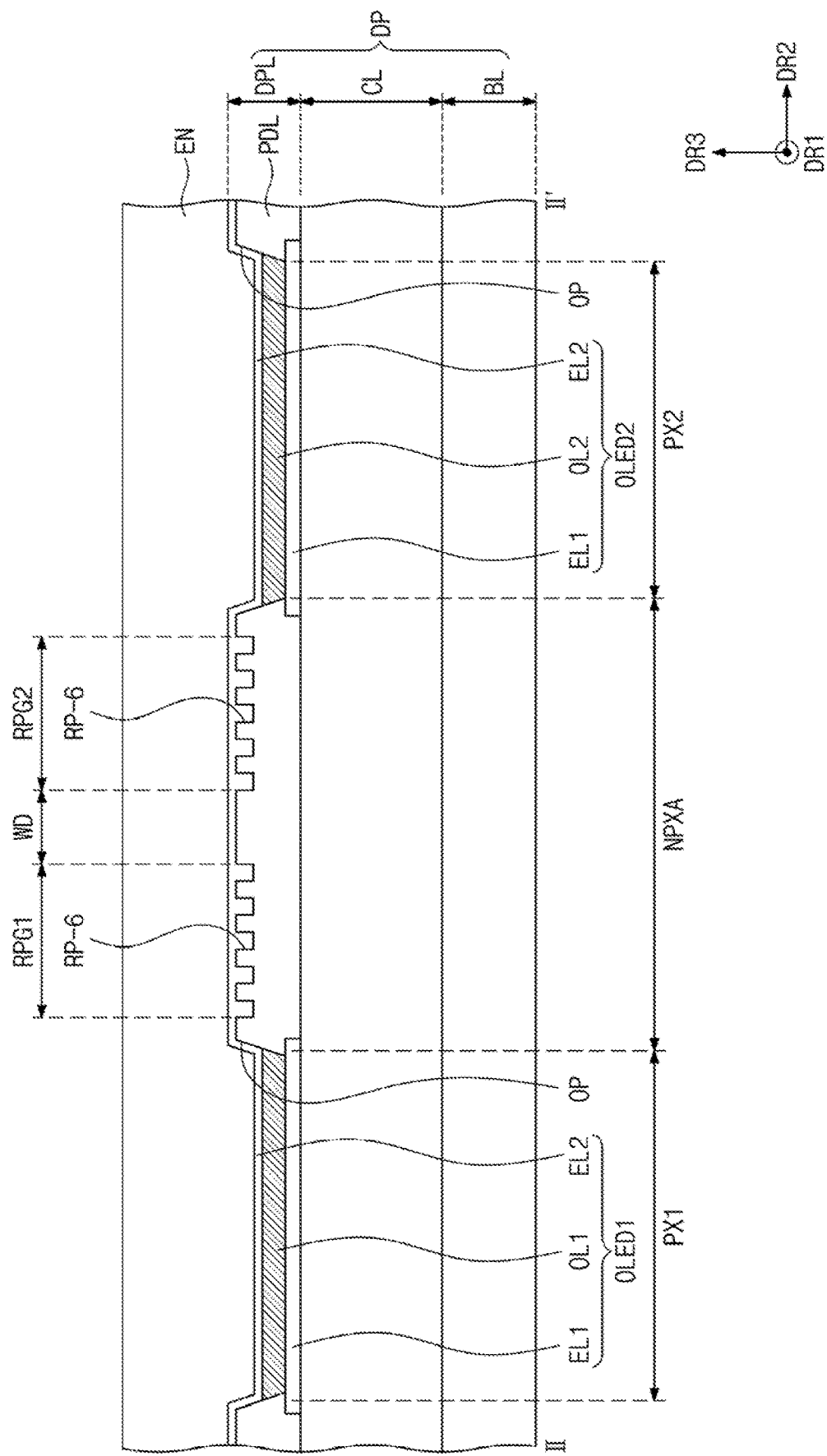
FIG. 18 is a cross-sectional view taken along line II-II' of FIG. 17.

The pixel areas PA may be defined by a pixel defining layer PDL (refer to, e.g., FIGS. 17 and 18). The plurality of pixels PX1 to PX3 may be disposed on the pixel areas PA, respectively. Each of the pixels PX1 to PX3 may include organic light emitting diodes OLED1 and OLED2 (refer to, e.g., FIG. 18).

The plurality of pixels PX1 to PX3 may include a first pixel PX1, a second pixel PX, and a third pixel PX3. Each of the first to third pixels PX1 to PX3 may emit light having a different color. For example, the first pixel PX1 may generate light having a first color. Accordingly, the display panel DP may realize an image through a combination of light generated by the plurality of pixel areas PA.

The non-display area NDA might not display an image. The non-display area NDA may surround the display area DA when the display apparatus 1000-6 is viewed from a direction in which an image is displayed.

The display panel DP may include a base layer BL, a circuit layer CL, and a display layer DPL. The circuit layer CL and the display layer DPL may be sequentially disposed on the base layer BL. The base layer BL may be a substrate including an insulating material such as glass, plastic, or crystal. For example, the base layer BL may include a synthetic resin film. The present invention is not particularly limited to the material of the base layer BL. The base layer BL may be selected in consideration of a mechanical strength, a thermal stability, a transparency, a surface roughness, a tractability, and/or a waterproofing property.

The plurality of pixels PX1 to PX3 may be provided over the circuit layer CL and the display layer DPL. Each of the pixels PX1 to PX3 may receive an electrical signal to generate light.

Each of the pixels PX1 to PX3 may include a first transistor, a capacitor, a second transistor, and the organic light emitting diodes OLED1 and OLED2 (refer to, e.g., FIG. 18). The first transistor, the capacitor, and the second transistor may be disposed in the circuit layer CL, and the organic light emitting diodes OLED1 and OLED2 (refer to, e.g., FIG. 18) may be disposed in the display layer DPL. The organic light emitting diodes OLED1 and OLED2 (refer to, e.g., FIG. 18) may include a light emitting material. The organic light emitting diodes OLED1 and OLED2 (refer to, e.g., FIG. 18) may generate light having a color corresponding to the light emitting material. The color of the light generated from the organic light emitting diodes OLED may be one of red, green, blue, or white.

The encapsulation member EN may be disposed on the display panel DP. The encapsulation member EN may substantially cover the display layer DPL. The encapsulation member EN may protect the display layer DPL from external moisture or pollutants.

FIG. 17 is a plan view illustrating the display layer in FIG. 15, and FIG. 18 is a cross-sectional view taken along line II-II' in FIG. 17. As an example, FIG. 18 is illustrated with respect to areas on which partial components of the first and second pixels PX1 and PX2 in FIG. 17.

Referring to FIGS. 17 and 18, the display layer DPL may include the organic light emitting diodes OLED1 and OLED2. The organic light emitting diodes OLED1 and OLED2 may be disposed on the circuit layer CL. Each of the organic light emitting diodes OLED1 and OLED2 may include a first electrode EL1, a second electrode EL2 disposed on the first electrode EL1, and a light emitting layer OL1 and OL2 disposed between the first electrode EL1 and the second electrode EL2.

The first electrode EL1 may be a pixel electrode or positive electrode. The first electrode EL1 may be a transmissive electrode, a transflective electrode, or a reflective electrode. When the first electrode EL1 is the transmissive electrode, the first electrode EL1 may include a transparent metal oxide such as an indium tin oxide (ITO), an indium zinc oxide (IZO), a zinc oxide (ZnO), or an indium tin zinc oxide (ITZO). When the first electrode EL1 is the transflective or the reflective electrode, the first electrode EL1 may include Ag, Mg, Al, Pt, Pd, Au, Ni, Nd, Ir, Cr, or a mixture thereof.

The second electrode EL2 may be a common electrode or negative electrode. The second electrode EL2 may be a transmissive electrode, a transflective electrode, or a reflective electrode. When the second electrode EL2 is the transmissive electrode, the second electrode EL2 may include Li, Ca, LiF/Ca, LiF/Al, Al, Mg, BaF, Ba, Ag or a compound or a mixture (e.g., a mixture of Ag and Mg) thereof. However, the present invention is not limited thereto. For example, the second electrode EL2 may include, e.g., an indium tin oxide (ITO), an indium zinc oxide (IZO), a zinc oxide (ZnO), or an indium tin zinc oxide (ITZO). When the second electrode EL2 is the transflective electrode or the reflective electrode, the second electrode EL2 may include Ag, Mg, Al, Pt, Pd, Au, Ni, Nd, Ir, Cr, Li, Ca, LiF/Ca, LiF/Al, Mo, Ti, or a compound or a mixture (e.g., a mixture of Ag and Mg) thereof. Alternatively, the second electrode EL2 may have a multi-layered structure including a reflective layer or transflective layer and a transparent conductive layer made of an indium tin oxide (ITO), an indium zinc oxide (IZO), a zinc oxide (ZnO), or an indium tin zinc oxide (ITZO).

The pixel defining layer PDL may be disposed on the first electrode EL1. For example, the pixel defining layer PDL may cover a portion of the first electrode EL1 and expose another portion of the first electrode EL1. The pixel defining layer PDL may include, but is not limited to a material thereof, a metal-fluorine ion compound. For example, the pixel defining layer PDL may include a metal-fluorine ion compound of LiF, $BaF_2$, or CsF. When the metal-fluorine ion compound has a predetermined thickness, the metal-fluorine ion compound may have an insulating property.

The pixel defining layer PDL may define an opening OP. The opening OP of the pixel defining layer PDL may define a light emitting area.

The light emitting layer OL1 and OL2 may be disposed between the first electrode EL1 and the second electrode EL2. For example, the light emitting layer OL1 and OL2 may be disposed in the opening OP defined in the pixel defining layer PDL. The light emitting layer OL1 and OL2 may overlap a light emitting area defined by the opening OP of the pixel defining layer PDL.

A plurality of common layers may be further disposed between the first electrode EL1 and the second electrode EL2 in addition to the light emitting layer OL1 and OL2. For example, a hole injecting layer, a hole transporting layer, a light emitting layer, an electron transporting layer, and an electron injecting layer may be sequentially laminated between the first electrode EL1 and the second electrode EL2. In addition to this, at least one of a hole blocking layer, a hole buffer layer, and an electron blocking layer may be further disposed between the first electrode EL1 and the second electrode EL2.

According to an exemplary embodiment of the present invention, the pixel defining layer PDL disposed between the pixels PX1 to PX3 adjacent to each other may include a plurality of diffraction patterns RP-6 provided on an area of a top surface of the pixel defining layer PDL.

For example, the pixel defining layer DPL may include a plurality of diffraction pattern groups RPG1 to RPG3 provided between the first pixel PX1 and the second pixel PX2 and between the second pixel PX2 and third pixel PX3 on an area of the pixel defining layer PDL.

The first diffraction pattern group RPG1 and the second diffraction pattern group RPG2 may be disposed between the first pixel PX1 and the second pixel PX2 on the area of the pixel defining layer PDL. The first diffraction pattern group RPG1 may be s disposed adjacent to the first pixel PX1, and the second diffraction pattern group RPG2 may be disposed adjacent to the second pixel PX2.

The second diffraction pattern group RPG2 and the third diffraction pattern group RPG3 may be disposed between the second pixel PX2 and the third pixel PX3 on the area of the pixel defining layer PDL. The second diffraction pattern group RPG2 may be disposed adjacent to the second pixel PX2, and the third diffraction pattern group RPG3 may be disposed adjacent to the third pixel PX3.

As an example below, the area of the pixel defining layer PDL defined between the first pixel PX1 and the second pixel PX2 will be exemplarily described.

Each of the first and second diffraction pattern groups RPG1 and RPG2 disposed between the first pixel PX1 and the second pixel PX2 may include a plurality of diffraction patterns RP-6. The diffraction patterns RP-6 may have a shape protruding upward from the top surface of the pixel defining layer PDL. The diffraction patterns RP-6 may be spaced apart from each other in the second direction DR2 and extend in the first direction DR1.

Although the diffraction pattern groups RPG1 to RPG3 arranged in the second direction DR2 and extending in the first direction DR1 are illustrated in FIG. 15, the present invention is not limited thereto. According to an exemplary embodiment of the present invention, the diffraction pattern groups may be arranged in the first direction DR1 and extend in the second direction DR2 between the pixels adjacent to each other in the first direction DR1.

In an exemplary embodiment of the present invention, each of the diffraction patterns RP-6 may have a rectangular cross-sectional shape. Side surfaces of each of the diffraction patterns RP-6 may be parallel to each other in the second direction DR2.

The diffraction patterns RP-6 may have a predetermined frequency P1 in the first direction DR1. According to an exemplary embodiment of the present invention, a wavelength of light incident into the diffraction patterns RP-6 may be s defined as $\lambda$, a refractive index of the light guide member 300 may be defined as n, a refractive index of the pixel defining layer PDL may be defined as n1, and a refractive index of the encapsulation member EN defining a boundary with the pixel defining layer PDL may be defined as n2, the frequency of the diffraction patterns RP-6 may be $\lambda/n(\sin\theta1 - \sin\theta2)$. For example, the frequency of the diffraction patterns RP-6 may be equal to or greater than about 300 nm and equal to or less than about 500 nm.

According to an exemplary embodiment of the present invention, a distance WD between the first diffraction pattern group RPG1 and the second diffraction pattern group RPG2 may be equal to or greater than a distance between the diffraction patterns RP-6.

Each of the diffraction patterns RP-6 may have a first length h1 (e.g., a first height). In an exemplary embodiment of the present invention, the first height h1 may be equal to or greater than about 150 nm and equal to or less than about 300 nm.

The distance between the diffraction patterns RP-6 may have a first width W1 in the first direction DR1. In an exemplary embodiment of the present invention, the first width W1 may be equal to or greater than about 100 nm and equal to or less than about 200 nm.

According to an exemplary embodiment of the present invention, when the diffraction patterns RP-6 is not provided on the pixel defining layer PDL defined between the first and second pixels PX1 and PX2, light generated from the light emitting layer OL1 and OL2 of the first and second pixels PX1 and PX2 may be emitted along the top surface of the pixel defining layer PDL. In case of a display apparatus for virtual reality (VR), since the pixels PX and PX2 are enlarged and displayed, the pixel defining layer PDL between the pixels PX1 and PX2 may be enlarged to be seen. According to an exemplary embodiment of the present invention, the plurality of diffraction patterns RP-6 may serve to diffract the light emitted to the pixel defining layer PDL from the light emitting layer OL1 and OL2. For example, since the light is collected in the area of the pixel defining layer PDL, a phenomenon in which the pixel defining layer PDL is seen may be relieved even when the VR mode is applied to the display apparatus 100-6 according to an exemplary embodiment of the present invention. For example, the display apparatus 1000-6 may have increased display quality.

According to an exemplary embodiment of the present invention, the display apparatus may have increased display quality. For example, according to an exemplary embodiment of the present invention, the display apparatus having an increased contrast ratio in the dark state may be provided.

While the present invention has been shown and described with reference to the exemplary embodiments thereof, it will be apparent to those of ordinary skill in the art that various changes in form and detail may be made thereto without departing from the spirit and scope of the present invention.

What is claimed is:

1. A display apparatus comprising:
   a display member configured to display an image;
   a light guide member disposed below the display member; and
   a light source configured to generate light and disposed adjacent to the light guide member,
   wherein the light guide member comprises a plurality of diffraction patterns disposed on a bottom surface of the light guide member and spaced apart from each other in a first direction,
   the plurality of diffraction patterns diffract incident light, which is incident at an incident angle, to change the incident light to diffraction light having a diffraction angle,
   the incident angle is defined as an angle between the incident light and a normal line that is perpendicular to a top surface or a bottom surface of the light guide member,
   the diffraction angle, which is defined as an angle between the diffraction light and the normal line, has a magnitude less than that of the incident angle,
   wherein a reflective member is disposed below the light guide member,
   wherein a lower surface of the diffraction patterns contacts the reflective member and an upper surface of the diffractions patterns protrudes above the bottom surface of the light guide member, and
   wherein a frequency of the diffraction patterns is $\lambda/(n \sin \theta_1 - \sin \theta_2)$,
   wherein $\lambda$ is a wavelength of light incident into the diffraction patterns, n is a refractive index of the light guide member, $\theta_1$ is the angle of the incident light, and $\theta_2$ is the angle of the emitted light.

2. The display apparatus of claim 1, wherein the diffraction angle is equal to or greater than 0° and equal to or less than about 10°.

3. The display apparatus of claim 2, wherein each of the diffraction patterns has a rectangular cross-sectional shape.

4. The display apparatus of claim 3, wherein each of the diffraction patterns has side surfaces that are parallel to each other in the first direction.

5. The display apparatus of claim 4, wherein each of the parallel side surfaces of each of the diffraction patterns are inclined at an oblique angle from the bottom surface of the light guide member.

6. The display apparatus of claim 5, wherein the inclined angle has a magnitude equal to or greater than about 20° and equal to or less than about 80°.

7. The display apparatus of claim 2, wherein the plurality of diffraction patterns are grouped into a diffraction pattern group,
   the diffraction pattern group is provided in plurality, and
   a distance between the plurality of diffraction pattern groups is equal to or greater than a frequency of the diffraction patterns.

8. The display apparatus of claim 7, wherein the distance between the plurality of diffraction pattern groups gradually decreases as each of the plurality of diffraction pattern groups are further away from the light source in the first direction.

9. The display apparatus of claim 7, wherein the display member comprises:
   a first substrate on which a plurality of pixels are disposed;
   a second substrate disposed on the first substrate and on which a light conversion layer is disposed; and
   a liquid crystal layer disposed between the first substrate and the second substrate,
   wherein the light conversion layer converts a wavelength band of incident light.

10. The display apparatus of claim 9, wherein the light source generates first light having a first wavelength band,
    the light conversion layer comprises a plurality of first quantum dots configured to convert the first light provided from an optical filter layer into second light having a second wavelength band, and
    the first wavelength band has a central wavelength less than that of the second wavelength band.

11. The display apparatus of claim 10, wherein the light conversion layer further comprises a plurality of second quantum dots configured to convert the first light provided from the optical filter layer into third light having a third wavelength band, and
    the third wavelength band has a central wavelength that is less than that of the second wavelength band and greater than that of the first wavelength band.

12. The display apparatus of claim 11, wherein each of the first quantum dots has a size greater than that of each of the second quantum dots.

13. The display apparatus of claim 12, wherein the first light is blue light.

14. The display apparatus of claim 10, wherein the display member further comprises:
- a first polarizing layer disposed below the second substrate; and
- a second polarizing layer disposed between the liquid crystal layer and the light conversion layer.

15. The display apparatus of claim 1, wherein each of the plurality of diffraction patterns comprises first to m-th portions disposed on the bottom surface of the light guide member,
- the first to m-th portions are sequentially laminated,
- the m-th portion is biased in the first direction on the m−1-th portion to expose a portion of the m−1-th portion, and
- the m is a natural number greater than about 1.

16. The display apparatus of claim 15, wherein a side surface of each of the plurality of diffraction patterns in the first direction has a stair shape.

17. The display apparatus of claim 1, wherein a frequency of the plurality of diffraction patterns is equal to or greater than about 300 nm and equal to or less than about 500 nm.

18. A backlight unit comprising:
- a light guide member having a light incident surface defined on a side surface thereof in a first direction;
- a light source configured to generate light and disposed adjacent to the light incident surface; and
- a reflective member disposed below the light guide member,
- wherein the light guide member comprises a plurality of diffraction patterns disposed on a bottom surface of the light guide member, a lower surface of the plurality of diffraction patterns contacts the reflective member and an upper surface of the diffraction patterns protrudes above the bottom surface of the light guide member,
- the plurality of diffraction patterns are spaced apart from each other in the first direction, and
- diffraction light, which is defined as light diffracted by the plurality of diffraction patterns, forms an angle equal to or greater than 0° and equal to or less than about 10° with a normal line perpendicular to a top surface or a bottom surface of the light guide member, and
- wherein a frequency of the diffraction pattern is $\lambda/(n \sin \theta 1 - \sin \theta 2)$,
- wherein $\lambda$ is a wavelength of light incident into the diffraction patterns, n is a refractive index of the light guide member, $\theta 1$ is the angle of the incident light, and $\theta 2$ is the angle of the emitted light.

* * * * *